United States Patent [19]

Schumacher

[11] 3,999,637
[45] Dec. 28, 1976

[54] PARKING BRAKE CONSTRUCTION

[75] Inventor: Gary B. Schumacher, Navarre, Ohio

[73] Assignee: Aspro, Incorporated, Canton, Ohio

[22] Filed: Oct. 31, 1975

[21] Appl. No.: 627,542

[52] U.S. Cl. ............................. 188/106 A; 188/331
[51] Int. Cl.[2] ........................................ F16D 51/22
[58] Field of Search ............ 188/78, 106 A, 106 F, 188/325, 331

[56] References Cited
UNITED STATES PATENTS

| 3,322,237 | 5/1967 | Keller et al. | 188/331 |
| 3,482,658 | 12/1969 | Keller | 188/331 |

*Primary Examiner*—Duane A. Reger
*Attorney, Agent, or Firm*—Frease & Bishop

[57] ABSTRACT

A mechanically actuated parking brake having a pair of brake shoes movably mounted and arranged in end-to-end relationship on a fixed backing plate. A pair of levers is pivotally mounted on the backing plate. The levers are interposed between a pair of opposed brake shoe ends and a hydraulic actuator for moving the brake shoe into engagement with the brake drum upon actuation of the vehicle service brake. The branch legs of a Y-shaped cable extend between the swinging ends of the levers with the main cable leg extending about a pulley and connected to a windup reel. The windup reel is rotatably mounted on one end of a brake actuating handle, with the other end of the handle being connected to a parking brake actuating pedal or lever. Application of the vehicle parking brake rotates the windup reel upon rotation of the handle which tensions the cable and draws the lever ends inwardly and expands the brake shoes outwardly into engagement with the brake drum.

11 Claims, 2 Drawing Figures

PARKING BRAKE CONSTRUCTION

BACKGROUND OF THE INVENTION

1. Field of the Invention

The invention relates to vehicle brakes and in particular to mechanically actuated parking brakes. More particularly, the invention relates to a parking brake construction having a pair of brake shoe operating levers which are actuated by a Y-shaped cable having a floating junction point which enables braking force to be applied to both brake shoes regardless of unequal brake shoe movement.

2. Description of the Prior Art

Numerous brake constructions for vehicles have incorporated therein both a hydraulic actuator for expanding the brake shoes outwardly into braking engagement with a drum upon applying the service brake, as well as a mechanical applying device for actuating the brake shoes upon applying a parking brake pedal or lever. Examples of such dual brake constructions are shown in U.S. Pat. Nos. 2,060,874, 2,127,739, 2,374,526, 3,023,853, 3,322,237, and 3,482,658.

Problems exist in many cable actuated parking brake constructions in that the brake shoes and actuating levers thereof have unequal movement due to the rotational force exerted on the shoes by the brake drum. One of the brake shoes becomes a leading shoe with the other brake shoe being a trailing shoe depending upon the rotational force exerted by the drum on the shoes. This force causes the shoes to move unequal distances with respect to the drum and backing plate creating unequal cable tensions for each shoe and in many instances preventing the parking brake force from being applied to one of the levers and associated shoe.

The brake constructions of U.S. Pat. Nos. 3,322,237 and 3,482,658 attempt to eliminate these problems by providing a sliding connection between a bellcrank actuating lever and a control cable which operatively connects the ends of brake shoe levers.

No parking brake construction of which I am aware eliminates the problems produced by unequal brake shoe movement by providing a Y-shaped actuating cable for operatively connecting the swinging ends of a pair of brake shoe levers to an operating handle, in which the Y-junction of the cable is freely moveable, the amount and direction of such movement being dependent upon the brake shoe movements.

SUMMARY OF THE INVENTION

Objectives of the invention include providing a vehicle parking brake construction of the type having a pair of levers interposed between the ends of a hydraulic service brake actuator and the brake shoes for moving the brake shoes into engagement with the drum in which a mechanical parking brake mechanism is operatively connected to the swinging ends of the levers; providing such a brake construction in which the lever ends are moved inwardly in opposite directions by a control cable to expand the brake shoes outwardly upon application of a mechanical parking brake; providing such a brake construction in which the actuating cable has a generally Y-shaped configuration with the Y-junction being freely moveable in various directions, the amount and direction of such movement being dependent upon the amount and direction of brake shoe movement to insure that the parking brake force is applied to each of the brake shoes regardless of the relative movement of the shoes; providing such a brake construction in which the parking brake actuating components are relatively unaffected by operation of the hydraulic service brake components thereby reducing wear on the parking brake components; and providing such a praking brake construction which is of a simple and rugged construction, which eliminates difficulty heretofore encountered, achieves the enumerated objectives simply, efficiently, and effectively and solves problems and satisfies existing needs.

These objectives and advantages are obtained by the parking brake construction, the general nature of which may be stated as including a backing plate adapted to be mounted on a stationary part of a vehicle axle; a pair of brake shoes slidably mounted in end-to-end relationship on the backing plate and expandable towards and against a brake drum; a hydraulic brake actuator mounted on the backing plate and located between a pair of opposed ends of the brake shoes; strut means interconnecting the other pair of opposed brake shoe ends; a pair of lever means pivotally mounted on the backing plate, each of the lever means having a thrust transmitting portion and a swinging end portion, the thrust transmitting portions being interposed between and respectively engageable with the ends of the hydraulic brake actuator and said pair of opposed ends of the brake shoes; handle means pivotally mounted on the backing plate, the handle means having an extended end adapted to be acted upon by a parking brake actuating force; reel means rotatably mounted on the backing plate and operatively connected to the handle means; pulley means mounted on the backing plate in the vicinity of the other pair of opposed brake shoe ends; first cable means extending between the swinging end portions of the levers; and second cable means firmly connected to the midpoint of the first cable means and extending about the pulley means and connected to the reel means, whereby application of a parking brake force to the handle means rotates the reel means to partially wind the second cable means about the reel means thereby tensioning the first and second cable means to draw the lever swinging end portions inwardly moving the brake shoes outwardly through the interposed thrust transmitting portions of the levers and into engagement with the brake drum.

BRIEF DESCRIPTION OF THE DRAWINGS

A preferred embodiment of the invention — illustrative of the best mode in which applicant has contemplated applying the principles — is set forth in the following description and shown in the drawings, and is particularly and distinctly pointed out and set forth in the appended claims.

FIG. 1 is a front elevational view of the improved parking brake construction in combination with a hydraulic service brake actuating mechanism mounted within a brake drum shown in section; and FIG. 2 is an end elevational view with portions broken away and in section, looking in the direction of Arrows 2—2, FIG. 1.

Similar numerals refer to similar parts throughout the drawings.

DESCRIPTION OF THE PREFERRED EMBODIMENT

The improved parking brake construction is indicated generally at 1, and includes a usual backing plate 2, which is adapted to be mounted on a fixed part of a vehicle axle. A pair of brake shoes 3 and 4 are slidably mounted on backing plate 2 in end-to-end relationship for engagement with a rotatable brake drum 5. Brake shoes 3 and 4 each have a rim 6 with a lining 7 of frictional material mounted thereon and a transverse web 8 attached at its outer edge to rim 6.

A usual hydraulically operated brake actuator, indicated generally at 10, is mounted on backing plate 2 and is located between the upper pair of adjacent brake shoe ends. A pair of similar levers 11 and 12 is pivotally mounted by pins 13 on backing plate 2 adjacent the ends of actuator 10. Actuator 10, and levers 11 and 12 may be of the type as shown in pending application Ser. No. 627,250, filed Oct. 30, 1975 and assigned to the same Assignee of this application.

Figures 1, 2:
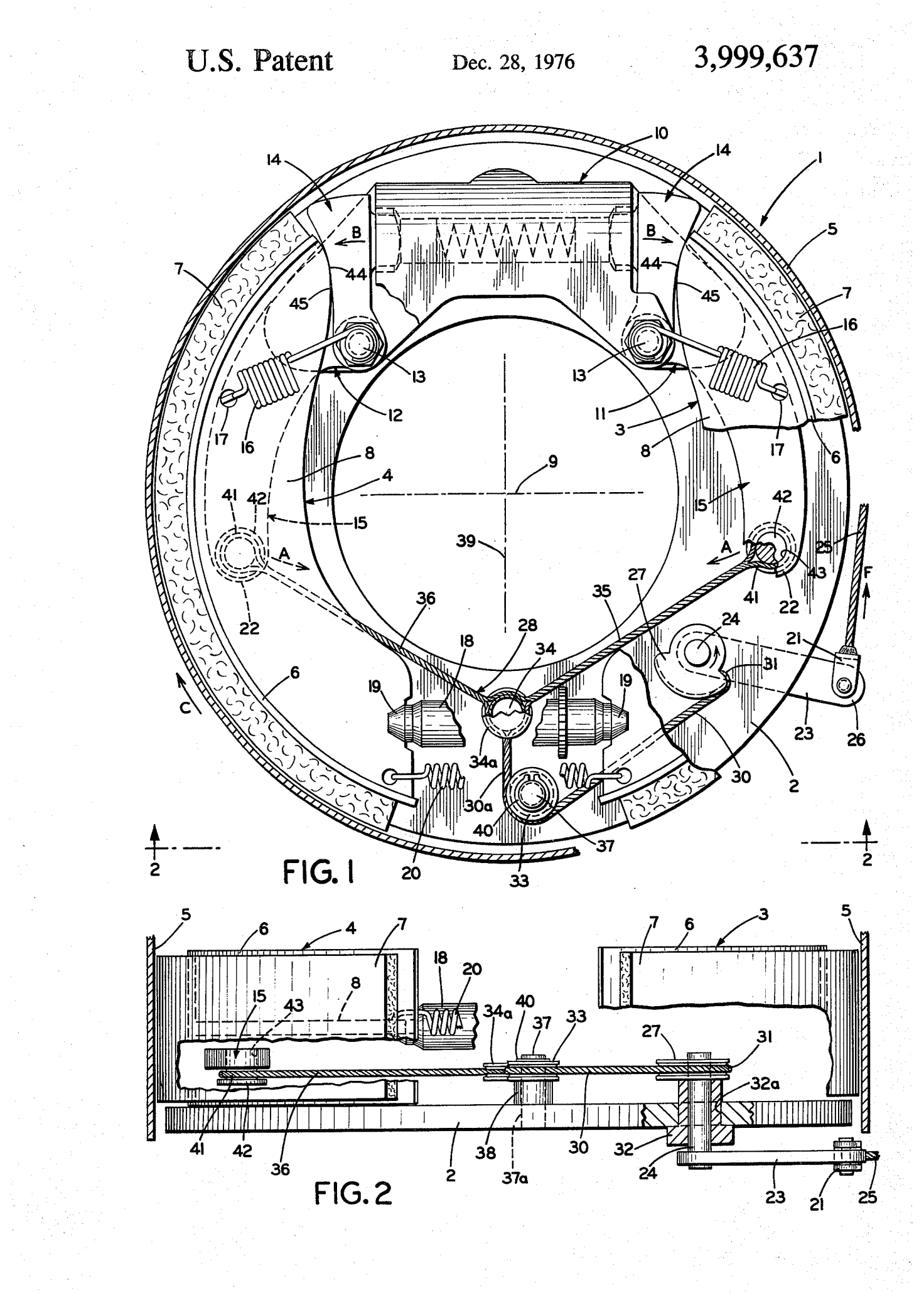

Levers 11 and 12 each include a thrust transmitting camming portion 14, which extends between the upper pair of brake shoe ends and actuator 10, and an arcuate-shaped swinging end 15. Swinging ends 15 are located between a respective brake shoe and backing plate 2, and extend downwardly along the front surface of backing plate 2, preferably terminating below the plane of the horizontal center line 9 of the backing plate as illustrated in FIG. 1. Return springs 16 are connected at one end to brake shoes 3 and 4 through holes 17 and at their other ends to pivot pins 13 for returning the brake shoes to their retracted or unactuated position of FIG. 1.

A usual manually adjusted strut 18 extends between and separates the lower opposed brake shoe ends, with brake shoe webs 8 being received within slotted ends 19 of strut 18. A spring 20 maintains the lower brake shoe ends in engagement with strut 18. If desired, strut 18 may be of the automatic self-adjusting type, such as shown in my copending application, Ser. No. 627,543 filed Oct. 31, 1975.

In accordance with the invention an improved handle actuated, cable control mechanism is mounted on the lower portion of backing plate 2 and is operatively connected to the free ends 22 of lever swinging ends 15.

The control mechanism includes an actuating handle 23 which is pivotally mounted by a pin 24 on the underside or rear surface of backing plate 2. A cable 25 is connected by a clevis 21 to swinging end 26 of handle 23 and extends to a parking brake pedal or the like (not shown) located within the interior of the vehicle. A windup reel 27 which may resemble a pulley segment, is fixed on an end of pin 24 opposite of handle 23 so as to rotate directly with the swinging movement of handle 23. Pin 24 is rotatably mounted within a bearing sleeve 32 which is press-fitted within an opening 32a formed in backing plate 2.

A generally Y-shaped control cable 28 operatively interconnects handle 23 with lever end portions 15 for actuating brake shoes 3 and 4 upon applying the vehicle parking brake. Cable 28 includes a main cable leg 30 or first control cable segment, which is secured at 31 to windup reel 27, and which extends about a pulley 33. Main leg 30 forms a Y-branch jucnction 34 with the ends of a pair of cable branch legs 35 and 36 or second and third control cable segments, about a grooved ring 34a. Cable main and branch legs 30, 35–36 preferably lie in a plane parallel to and spaced from the front surface of backing plate 2 as shown in FIG. 2.

Pulley 33 is rotatably mounted on the top surface of backing plate 2 by a pin 37 which extends through a spacer sleeve 38. Pin 37 is press-fitted within an opening 37a formed in plate 2. A snap ring 40 retains pulley 33 on pin 37. Pin 37 preferably is located off center with respect to the plane of the vertical axis 39 of backing plate 2 so that vertically extending portion 30a of main cable leg 30 which extends between junction point 34 and pulley 33, is aligned with axis 39. Pulley 33 changes the direction of main cable leg 30 preferably through an angle greater than 90° to provide a compact arrangement of the brake components within the confined available space.

Cable 28 preferably is a continuous braided cable with the individual cable strands being separated at junction 34 and formed about grooved ring 34a. The extended ends of cable branch legs 35 and 36 are formed with loops 41. Loops 41 extend about pins 42 which are press-fitted within openings 43 formed in the extended ends 22 of lever ends 15 to connect cable branch legs 35 and 36 to levers 11 and 12, respectively.

The operation of improved parking brake construction 1 is as follows: Handle 23 pivots in a counterclockwise direction (FIG. 1) about pin 24 upon a mechanical braking force F being applied to handle 23 through upward movement of cable 25. Reel 27 in turn is rotated counterclockwise by the movement of handle 23 through connecting pin 24, winding main cable leg 30 partially about reel 27 thereby applying a tensioning force to cable leg 30. Cable leg 30, consequently, is drawn about pulley 33 exerting a downward force on cable junction point 34. This downward force on junction 34 and ring 34a pivots free ends 22 of lever ends 15 in opposite inwardly directions (Arrow A) which in turn pivots lever thrust portions 14 in opposite outwardly directions (Arrow B) about pins 13.

Brake shoes 3 and 4 are moved outwardly with lining 7 engaging brake drum 5 through the sliding camming action of arcuate surfaces 44 of lever thrust portions 14 with arcuate surfaces 45 of the upper brake shoe ends in a similar manner as descried in said pending application Ser. No. 627,250, filed Oct. 30, 1975. Brake shoes 3 and 4 will remain in engaged position with drum 5 so long as force F is maintained on cable 25. Springs 16 return shoes 3 and 4 to their retracted positions upon release of force F, with the spring return force being transmitted to levers 11 and 12 through camming surfaces 44 and 45. Lever ends 15 then will move outwardly in opposite directions returning handle 23 to its unactuated position through the generally upward movement of cable legs 30, 35 and 36.

Operation of hydraulic actuator 10 upon applying the vehicle service brake, pivots lever thrust portions 14 outwardly in the direction of Arrow B, with lever ends 15 swinging inwardly. This inward movement of lever ends 15 creates a very small amount of slack in cable legs 30, 35 and 36 and has no effect on handle 23. Thus, the parking brake mechanism is not appreciably affected upon actuation of the service brake mechanism, nor is the hydraulic service brake actuator affected upon use of the parking brake thereby eliminating needless operations resulting in unnecessary wear on the brake components.

One of the main features of the invention is the ability of cable junction point 34 to "float" or move freely in various directions depending upon the amount and direction of brake shoe and lever movements. Drum 5 generally will exert a rotational force on the brake shoes upon application of the parking brake due to the natural tendency of the vehicle to move forwardly or rearwardly unless parked on a level surface.

Assume drum 5 tends to rotate in a clockwise direction (Arrow C). Brake shoes 3 and 4 will move in a clockwise direction upon engagement with drum 5 which will cause junction point 34, which initially moved in a downward vertical direction, to move off center with respect of axis 39, generally to the left when viewing FIG. 1. This floating movement of junction point 34 maintains tension on both branch legs 35 and 36 and consequently exerts a generally equal braking force on shoes 3 and 4. Likewise, when the drum rotation is in a counterclockwise direction, shoes 3 and 4 will tend to rotate in a counterclockwise direction upon engaging the drum. This causes junction point 34, which initially moves downwardly, to move towards the right, in a somewhat arcuate manner to compensate for the additional amount of movement of brake shoe 4 required to contact drum 5, again maintaining brake force on both brake shoes.

Thus, improved parking brake construction 1 has the advantage of providing a mechanical actuated parking brake which compensates for unequal movement of the brake shoes and actuating levers by providing a floating connection at the point at which the actuating braking force is applied to the lever control cables insuring that the braking force is applied to both shoes. Brake construction 1 has the further advantage of being of a rugged, simple, relatively inexpensive arrangement of readily available components which reduce maintenance and repair problems. Another advantage of the improved brake construction is the ability to incorporate a hydraulic service brake actuator and/or an automatic self-adjusting strut mechanism if desired on the backing plate without affecting the arrangement and placement of the mechanical parking brake components.

Accordingly, the construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the parking brake construction is contructed and used, the characteristics of the construction, and the advantageous, new and useful results obtained; the new and useful structures, devices, elements, arrangements, parts, and combinations, are set forth in the appended claims.

I claim:
1. Parking brake construction including
  a. a backing plate adapted to be mounted on a stationary part of a vehicle axle;
  b. a pair of brake shoes slidably mounted in end-to-end relationship on the backing plate and expandable towards and against a brake drum;
  c. a hydraulic brake actuator mounted on the backing plate and located between a pair of opposed ends of the brake shoes;
  d. means interconnecting the other pair of opposed brake shoe ends;
  e. a pair of levers pivotally mounted on the backing plate, each of said levers having a thrust transmitting portion and a swinging end portion, said thrust transmitting portions being interposed between and respectively engageable with the ends of the hydraulic brake actuator and said pair of opposed ends of the brake shoes;
  f. handle means pivotally mounted on the backing plate, said handle means having an extended end adapted to be acted upon by a parking brake actuating force;
  g. reel means rotatably mounted on the backing plate and operatively connected to the handle means;
  h. pulley means mounted on the backing plate in the vicinity of said other pair of opposed brake shoe ends;
  i. first cable means extending between the swinging end portions of the levers; and
  j. second cable means firmly connected to the midpoint of the first cable means and extending about the pulley means and connected to the reel means, whereby application of a parking brake force to the handle means rotates the reel means to partially wind the second cable means on the reel means thereby tensioning the first and second cable means to draw the lever swinging end portions inwardly moving the brake shoes outwardly through the interposed thrust transmitting portions of the levers and into engagement with the brake drum.

2. The construction defined in claim 1 in which the backing plate has front and rear surfaces; in which pin means pivotally mount the other end of the handle means on the rear surface of the backing plate; and in which the reel means is mounted on said pin means on the front surface of the backing plate.

3. The construction defined in claim 1 in which the first and second cable means combine to form a cable having a Y-shaped configuration with a main leg and a pair of branch legs; in which the branch legs are respectively connected to the lever swinging end portions; and in which the main leg is connected to the reel means.

4. The construction defined in claim 3 in which ring means is connected to the main leg and branch legs to form the junction of the branch and main legs of the cable.

5. The construction defined in claim 3 in which the center of the pulley means is offset with respect to a plane passing through center of the backing plate and the junction point of the cable main leg and branch legs when the parking brake is unactuated.

6. The construction defined in claim 1 in which the pulley means changes the direction of the second cable means through an angle greater than 90°.

7. The construction defined in claim 2 in which the first and second cable means lie in a plane parallel with and spaced from the front surface of the backing plate.

8. Parking brake construction including:
  a. a backing plate adapted to be mounted on a stationary part of a vehicle axle;
  b. a pair of brake shoes slidably mounted in end-to-end relationship on the backing plate and expandable towards and against a brake drum;
  c. a pair of levers pivotally mounted on the backing plate, each of said levers having a thrust transmitting portion and a swinging end portion, each of said thrust transmitting portions operatively engageable with a respective brake shoe;
d. handle means pivotally mounted on the backing plate, said handle means having an end adapted to be acted upon by a parking brake actuating force;
e. reel means rotatably mounted on the backing plate and operatively connected to the handle means;
f. post means mounted on the backing plate in a fixed position with respect to said backing plate, and in the vicinity of a pair of opposed ends of the brake shoes;
g. first cable means extending between the swinging end portions of the levers; and
h. second cable means having first and second ends, with the first end fixedly connected to the first cable means intermediate the swinging end portions of the levers and with the second end fixedly connected to the reel means, said second cable means extending about the post means to change the direction of said second cable means; whereby application of a parking brake force to the handle means rotates the reel means to partially wind the second cable means about the reel means thereby tensioning the first and second cable means to draw the lever swinging end portions inwardly moving the brake shoes outwardly through the interposed thrust transmitting portions of the levers and into engagement with the brake drum.

9. The construction defined in claim 8 in which the post means includes a pin mounted on and extending outwardly from the backing plate having a pulley member rotatably mounted thereon; and in which the second cable means is operatively engaged with and extends about said pulley member.

10. Parking brake construction including:

a. a backing plate adapted to be mounted on a stationary part of a vehicle axle;
b. a pair of brake shoes slidably mounted in end-to-end relationship on the backing plate and expandable towards and against a brake drum;
c. a pair of lever means pivotally mounted on the backing plate, each of said lever means having a thrust transmitting portion and a swinging end portion, each of said thrust transmitting portions operatively engageable with a respective brake shoe;
d. handle means pivotally mounted on the backing plate, said handle means having an end adapted to be acted upon by a parking brake actuating force;
e. reel means rotatably mounted on the backing plate and operatively connected to the handle means;
f. pulley means mounted on the backing plate; and
g. cable means having a generally Y-shaped configuration with a pair of branch legs and a main leg, said branch legs each connected to a respective lever means swinging end portion, and said main leg connected to the reel means and extending about the pulley means to change the direction of said main leg, whereby application of a parking brake force to the handle means rotates the reel means to wind the cable means main leg partially about the reel means thereby tensioning the cable means to draw the lever swinging end portions inwardly moving the brake shoes outwardly through the thrust transmitting portions of the lever means and into engagement with the brake drum.

11. The construction defined in claim 10 in which hydraulic service brake actuator means is mounted on the backing plate and is operatively engageable with the thrust transmitting portions of the lever means.

* * * * *